United States Patent

Thetford et al.

[11] Patent Number: 5,981,624
[45] Date of Patent: Nov. 9, 1999

[54] COMPOSITION AND USE

[76] Inventors: Dean Thetford; David J. Cartridge, both of Hexagon House, P.O. Box 42, Blackley, Manchester, United Kingdom, M9 8 ZS

[21] Appl. No.: 08/964,017

[22] Filed: Nov. 4, 1997

Related U.S. Application Data

[63] Continuation-in-part of application No. PCT/GB97/00930, Apr. 2, 1997.

[30]        Foreign Application Priority Data

May 4, 1996 [GB]  United Kingdom ............... 9609436

[51] Int. Cl.$^6$ .......................... C09D 11/02; C08L 71/02; C08F 283/10; C08G 59/14
[52] U.S. Cl. ............... 523/160; 106/31.6; 106/31.85; 106/31.9; 525/409; 528/419
[58] Field of Search ................ 523/160, 161; 106/31.13, 31.6, 31.62, 31.85, 31.9; 525/409; 528/419

[56]         References Cited

U.S. PATENT DOCUMENTS

| | | | |
|---|---|---|---|
| 2,674,619 | 4/1954 | Lundsted | 560/198 |
| 2,677,700 | 5/1954 | Jackson et al. | 568/618 |
| 3,595,968 | 7/1971 | Groves, Jr. | 510/228 |
| 4,629,748 | 12/1986 | Miyajima et al. | 523/161 |
| 4,966,621 | 10/1990 | Heinrich et al. | 504/317 |
| 5,089,313 | 2/1992 | Cope | 428/151 |
| 5,412,021 | 5/1995 | Nakanishi | 524/523 |
| 5,416,156 | 5/1995 | Kamen | 524/520 |
| 5,711,800 | 1/1998 | Badejo et al. | 106/498 |

*Primary Examiner*—Vasu Jagannathan
*Assistant Examiner*—Callie E. Shosho
*Attorney, Agent, or Firm*—Pillsbury Madison & Sutro LLP

[57]             ABSTRACT

A reduced shade paint or ink comprising (a) a base paint or ink comprising a base pigment such as titanium dioxide, a film-forming resin and a non-polar liquid such as white spirits;

(b) one or more dispersant which is a phosphate ester of a compound of formula 1

$$Y-[(PO)_n(EO)_m]-H \qquad (1)$$

wherein

Y is a group RO— or a group H—$(EO)_q$—;

R is $C_{1-10}$-alkyl;

m and q are each, independently, from 5 to 50;

n is from 5 to 70; and (c) a tinter composition comprising a colored pigment, water and/or a water-miscible solvent such as ethyleneglycol.

18 Claims, No Drawings

COMPOSITION AND USE

This is a continuation-in-part of Internationl Appln. No. PCT/GB97/00930 filed Apr. 2, 1997.

The present invention relates to the use of phosphate esters of propylene oxide/ethylene oxide block co-polymers as dispersants for particulate solids in an organic medium and to compositions comprising such dispersants and particulate solids in an organic medium. More particularly, it relates to a reduced shade paint or ink containing one or more dispersants which is a phosphate ester of an optionally end-capped propylene oxide/ethylene oxide copolymer.

Phosphate esters of propylene oxide/ethylene oxide block copolymers (hereinafter PO/EO copolymers) where the ester group is attached to EO are already known to the art. The known phosphate esters include both the alkyl end-capped PO/EO block copolymers and also EO/PO/EO block copolymers carrying phosphate ester groups at both ends of the polymer.

U.S. Pat. No. 4,613,445 discloses phosphate esters of end-capped block copolymers of formula AOPOEO wherein A is inter alia $C_{1-24}$-alkyl and their use as corrosion inhibitors. This patent also discloses compositions comprising the phosphate esters, a buffer and an alcohol.

CA 2027302 discloses aqueous coolant compositions containing phosphate esters derived from fatty alcohol PO/EO polymers and EO/PO/EO block copolymers.

U.S. Pat. No. 3,658,959 discloses carbamate insecticidal compositions containing phosphate esters of EO/PO/EO block copolymers and aqueous solutions or dispersions derived therefrom.

DE 3542441 discloses bis-monophosphate esters of EO/PO/EO block copolymers and their use in the manufacture of plant protection formulations which are essentially solvent-free.

These publications disclose either aqueous compositions containing the phosphate esters of PO/EO copolymers or concentrates for use in aqueous systems and none envisage the use of such esters to disperse particulate solids, especially pigments, in non-aqueous media.

It has now been found that phosphate esters of PO/EO block copolymers wherein the phosphate ester is attached to EO are useful for dispersing particulate solids in organic liquids and especially in the preparation of mill bases for use in paints and printing inks.

According to a first aspect of the invention there is provided a composition of a particulate solid and a dispersant which is a phosphate ester of a compound of formula 1:

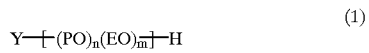

(1)

including salts thereof.
wherein
Y is a group RO— or a group H—$(EO)_q$;
R is $C_{1-6}$-alkyl;
m and q are each, independently, from 5 to 50; and
n is from 5 to 70.

The dispersants which are phosphate esters of the compound of formula 1 are hereinafter referred to as Phosphate Dispersants.

In a second aspect of the invention there is provided a composition comprising a dispersion of a particulate solid in an organic medium containing a Phosphate Dispersant.

In a third aspect of the invention there is provided a non-aqueous mill-base comprising a particulate solid, a film-forming resin, an organic medium and a Phosphate Dispersant.

At In a fourth aspect of the invention there is provided the use of a Phosphate Dispersant to disperse a particulate solid in an organic medium, especially a mill base.

In a fifth aspect of the invention there is provided a reduced shade paint or ink containing one or more Phosphate Dispersants wherein the paint or ink is obtainable by adding a tinter formulation to a base paint or ink.

The organic medium is preferably an organic liquid containing not greater than 50%, more preferably not greater than 20% and especially not greater than 10% by weight water. It is especially preferred that the organic medium is substantially free from water.

When Y is the group RO—, the dispersant is a phosphate ester of an end-capped PO/EO block copolymer which preferably contains either 1 or 2 groups of formula $RO(PO)_n(EO)_m$—attached to each phosphorus atom and especially mixtures thereof.

When Y is the group H—$(EO)_q$ the compound of formula 1 is a diol and the dispersant is a phosphate ester which preferably contains a phosphate group at each end of the diol. It is also preferred that each phosphorus atom forms an ester linkage with either 1 or 2 diols of formula H—$(EO)_q(PO)_n(EO)_m$—H and it is especially preferred that the dispersant is a mixture of such esters.

R may be linear or branched but is preferably linear and is especially methyl.

When Y is the group RO—, n and m are preferably and independently from 5 to 40 and especially from 5 to 25. It is also preferred that the ratio of m to n is from 3:1 to 1:5 more preferably from 2:1 to 1:5 and especially from 2:1 to 1:2.

The MW of the end-capped block copolymer of formula $RO(PO)_n(EO)_m$—H from which the dispersant is derived is preferably not less than 500 and more preferably not less than 1000. It is also preferred that the MW of this end-capped copolymer is not greater than 3,000 and especially not greater than 2,000.

When Y is the group H—$(EO)_q$—, m and q are preferably the same and are preferably, independently, from 5 to 20. In the case of the diol of formula H—$(EO)_q(PO)_n(EO)_m$—H it is also preferred that the ratio of (q+m) to n is from 2:1 to 1:5 and especially from 1:1 to 1:5. The MW of the diol of formula H—$(EO)_q(PO)_n(EO)_m$—H from which the dispersant is derived is preferably less than 5,000 and especially less than 4,000.

The particulate solid can be any material which it is desired to stabilise in a finely divided state in the organic medium. Examples of suitable solids are pigments and fillers for inks, paints and other surface coatings; magnetic metals or alloys and magnetic oxides, for use in the production of magnetic tapes, discs and memory devices; dirt and soil particles; biocides, agrochemicals and pharmaceuticals. The composition, whether dry or in the form of a dispersion, may contain other ingredients such as resins, binders, fillers, fluidising agents, anti-sedimentation agents, plasticisers, humectants, coalescents, co-solvents, thickeners and preservations. These ingredients may be soluble in, partially soluble in, insoluble in, or dispersed in the organic medium.

If the solid is a pigment, it may be organic or inorganic. Preferably the solid is an inorganic pigment, a metallic pigment, or a metal salt of an organic dyestuff (sometimes referred to as a lake or toner). It may come from any of the recognised classes of pigments described, for example, in the Third Edition of the Colour Index (1971) and subsequent revisions and supplements thereto, under the chapter headed "Pigments".

Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives and also lakes of acid, basic and mordant dyes.

Examples of inorganic pigments are titanium dioxide (including Anatase and Rutile forms, and high UV absorbing ultra-fine titanium dioxide), zinc oxide, Prussian Blue, cadmium sulphide, iron oxides (including transparent iron oxides), ultramarine, mica (including pearlescent pigments made by surface treating mica with, for example fine titanium dioxide) and the chrome pigments, including chromates, molybdates, and mixed chromates and sulphates of lead, zinc, barium, calcium and mixtures and modifications thereof which are commercially available as greenish-yellow to red pigments under the names of primrose, lemon, middle, orange, scarlet and red chromes.

It is to be understood that the term inorganic pigment also includes carbon black, especially the chemically modified or coated versions of carbon black used in the printing and paint industries.

Examples of metallic pigments are aluminium flake, copper powder and copper flake.

Examples of metal salts of organic dyestuffs are the azo metal salt pigments such as Cl Pigment Red 48 (also known as 2B Toner or Permanent Red 2B), Cl Pigment Red 53 (also known as Lake Red C or Red Lake C), Cl Pigment Red 52, Cl Pigment Red 57 (also known as 4B Toner, Lithol Rubine, Rubine Toner or Permanent Red 4B), Cl Pigment Red 58, Cl Pigment Red 247, Cl Pigment Yellow 61, Cl Pigment Yellow 62, Cl Pigment Yellow 183 and Cl Pigment Yellow 191.

Examples of fillers are calcium carbonate, hydrated alumina, talc, quartz, silica (precipitated, pyrogenic and synthetic), metal silicates, barium and calcium sulphate, china clay, antimony oxide, powdered slate, wollastonite and chopped glass fibre.

Preferably the particulate solid is a pigment, particularly an inorganic pigment and especially titanium dioxide.

The organic medium may be a film-forming resin,. but is preferably a liquid which is either a polar or non-polar organic liquid. The choice of organic liquid depends to a large extent on the end-use to which the dispersion is to be put. Thus, when the dispersion is to be used in a printing or packaging ink or mill-base therefor, the organic liquid is preferably a polar organic liquid. When the dispersion is to be used in a solvent-based paint or aqueous emulsion paint or mill-base therefor, the organic liquid is preferably non-polar.

The term polar organic liquid means those liquids capable of forming moderate or strong hydrogen bonds as described in the article entitled "A three dimensional approach to solubility" by Crowley et al in Journal of Paint Technology, Volume 38, 1966 at page 269. Such organic liquids have a hydrogen bonding number of 5 or more as defined in this article.

Examples of polar organic liquids are amines, ethers, especially $C_{1-16}$-alkyl ethers, organic acids, esters, ketones, glycols, alcohols and amides including mixtures thereof.

Numerous specific examples of such moderately and strongly hydrogen bonding liquids are given in the book entitled "Compatibility and Solubility" by Ibert Mellan (published 1968 by Noyer Development Corporation) in Table 2.14 on pages 28 and 40 and these organic liquids all fall within the scope of polar organic liquids as used in the present description.

Preferred polar organic liquids are dialkylketones, alkylesters of alkanecarboxylic acids, alkanols especially $C_{1-6}$-alkanols. Examples of preferred and especially preferred polar organic liquids are dialkylketones such as acetone, methylethylketone (MEK), diethylketone, diisopropylketone, methylisobutylketone and diisobutylketone; alkylesters such as methylacetate, ethylacetate, isopropylacetate, ethylformate, methylpropionate and ethylbutyrate; alkoxyalkylesters such as methoxypropylacetate and alkanols such as methanol, ethanol, n-propanol, isopropanol, n-butanol and isobutanol.

When the dispersion or mill-base is used to prepare a printing or packaging ink, the polar organic liquid is preferably ethanol or ethyl acetate, especially mixtures thereof, or methoxypropylacetate.

The term non-polar liquid means those liquids which are immiscible with water and include aliphatic and aromatic hydrocarbons and their halogenated analogues. Examples are pentane, hexane, heptane, octane, benzene, toluene, xylene, paraffin and petroleum fractions and distillates such as white spirits.

When the dispersion or mill-base is used in the preparation of a solvent-based paint, the non-polar solvent is preferably white spirits.

The dispersion may be made by any method known to the art. Thus, it may be made by mixing together the Phosphate Dispersant, particulate solid and organic liquid and grinding or milling the mixture to obtain a stable dispersion of the particulate solid in the organic liquid. Preferably, the particulate solid is ground or milled until the mean particle size is less than $15\mu$ diameter, more preferably less than $10\,\mu$ and especially less than $3\mu$.

The amount of Phosphate Dispersant is preferably at least 0.2%, more preferably at least 0.5% and especially at least 1% by weight based on the weight of particulate solid. Preferably, the amount of Phosphate Dispersant is not greater than 100%, preferably not greater than 50%, more preferably not greater than 20% and especially not greater than 10% by weight based on the weight of particulate solid.

A dry composition consisting essentially of the particulate solid and Phosphate Dispersant may be prepared by removing the organic liquid from the above mentioned dispersion. In such a case the organic liquid is preferably volatile to facilitate its removal. The dry composition so obtained consists essentially of the finely divided particulate solid which contains a surface coating of the Phosphate Dispersant. Such dry composition can be added to an organic medium to provide a uniform distribution of the particulate solid throughout the medium.

As noted hereinbefore, the Phosphate Dispersant may be used to prepare a mill-base comprising the particulate solid, dispersant, organic liquid and a film-forming resin. Implicit in the definition of mill-base is the grinding or milling of the particulate solid in the presence of both the dispersant and the film-forming resin.

The film-forming resin may be any resin known to the art, especially those used in the preparation of printing and packing inks and coatings especially flexographic inks and also resins used in the preparation of solvent-based paints.

Examples of film-forming resins which are used in the preparation of printing and packaging inks are nitrocellulose resins and resins obtainable by polymerising ethylenically unsaturated carboxylic acid esters such as polyvinylbutyrate.

The film-forming resins used in the preparation of solvent-based paints include both natural and synthetic resins such as alkyd resins, alkyd/melamine formaldehyde resins, air-drying alkyd resins, resins obtainable by (co) polymerising ethylenically unsaturated monomers such as styrene-butadiene resins, long oil alkyd resins, styrenated acrylics, urethane long oil resins and epoxy resins.

The dispersion or mill-base according to the invention preferably contains at least 5%, more preferably at least 20% and especially at least 40% by weight particulate solid based on the total weight of the dispersion or mill-base. Preferably the dispersion or mill-base contains not greater than 90%, more preferably not greater than 80% and especially not greater than 70% by weight particulate solid based on total weight of the dispersion or mill-base.

The mill-base according to the invention preferably contains greater than 2%, more preferably greater than 5% and especially greater than 10% by weight of film-forming resin based on the total weight of mill-base. It is preferred that the amount of film-forming resin is not greater than 40%, preferably not greater than 30% and especially not greater than 20% based on the total weight of the mill-base.

The mill-bases are generally diluted or let-down with a mixture of film-forming resin and organic liquid to give the final printing or packaging ink formulation or paint formulation. This final formulation may contain other adjuvants commonly added to inks or paints and such adjuvants are preferably added to the let-down. Examples of such adjuvants are extenders and materials which improve the flow characteristics of the ink or paint during application such as esters of aliphatic acids. Examples of such esters are di-octylphthalate, diisohexylphthalate, didecylphthalate, di-undecylphthalate, di(2-ethylhexyl)phthalate and di-octyladipate.

As disclosed hereinbefore there is provided the use of a Phosphate Dispersant to disperse a particulate solid in a non-aqueous mill-base. Whereas it is preferred that the Phosphate Dispersant is the prime dispersant for dispersing the particulate solid in the organic liquid of the mill base, the Phosphate Dispersant may also be used as a secondary dispersant for addition to a mill base or formulated ink or paint to improve the properties thereof.

The inks and paints made from the aforementioned dispersion or mill base exhibit enhanced properties compared with dispersions and mill bases prepared using alternative dispersants, especially enhanced gloss, transparency, brightness and reduced haze.

The Phosphate Dispersant has been found especially useful for preparing reduced shade paints and inks, especially where the reduced shade is obtainable by mixing a tinter with a base paint or ink in a non-aqueous medium.

According to a further aspect of the invention there is provided a reduced shade paint or ink comprising (a) a base paint or ink comprising a base pigment, a film-forming resin and a non-aqueous medium.

(b) one or more dispersant which is a phosphate ester of a compound of formula 1

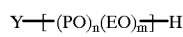

$$Y\text{---}[(PO)_n(EO)_m]\text{---}H \quad (1)$$

wherein
Y is a group RO— or a group H—(EO)$_q$—;
R is C$_{1-10}$-alkyl;
m and n are each, independently, from 5 to 50;
n is from 5 to 70; and (c) a tinter composition comprising a colored pigment, water and/or a water-miscible solvent.

The non-aqueous medium is preferably a non-polar organic liquid and is particularly an aromatic or aliphatic distillate, including mixtures thereof, and is especially white spirits. The base paint or ink contains a base pigment which may be any organic or preferably inorganic pigment such as ferric oxide but is preferably a white pigment, especially titanium dioxide. The tinter is typically a colored pigment which may be inorganic or organic (including carbon black) in an aqueous formulation or in a polar organic liquid which is preferably a water-miscible solvent, optionally containing water. Preferably, the water-miscible solvent is a glycol such as ethylene diglycol, propylene glycol, hexyleneglycol and especially ethyleneglycol. Other preferred water-miscible solvents are the mono-alkyl ethers of ethylene and propylene glycols, particularly the Cl-6 alkyl ethers and especially methoxyethoxyethanol. The tinter composition may also contain a dispersant which is other than a Phosphate Dispersant.

The base pigment may be dispersed in the non-aqueous medium in the presence of a dispersant which is other than a Phosphate Dispersant. In such a case the tinter pigment or composition containing the tinter pigment is preferably added to the base paint or ink after the addition of one or more dispersants which is a Phosphate Dispersant. It is also possible to add the tinter pigment or composition containing the tinter pigment together with the Phosphate Dispersant(s).

However, it is preferred to disperse the base pigment in the non-aqueous medium using one or more Phosphate Dispersants. When two or more Phosphate Dispersants are used, it is preferred that in at least one dispersant, Y is the group RO— and in at least one other dispersant, Y is the group (H—(EO)—$_q$. More preferably, the base pigment is dispersed in the non-aqueous medium in the presence of two or more Phosphate Dispersants wherein Y is the group H—(EO)—$_q$ and the dispersants have different n:(m+q) ratios. When the base pigment is dispersed in the non-aqueous medium. in the presence of only one Phosphate Dispersant, it is preferable to add another different Phosphate Dispersant prior to adding the tinter pigment or tinter pigment formulation. When the base pigment is dispersed in the non-aqueous medium in the presence of two or more Phosphate Dispersants, it is preferable to add the dispersants simultaneously.

When one or more Phosphate Dispersants are included in the reduced shade paint or ink, the base paint or ink exhibits better acceptance of the tinter composition. This is especially the case when two or more Phosphate Dispersants are included in the reduced shade paint or ink. The improved acceptance of the tinter composition is exhibited irrespective as to whether the Phosphate Dispersant(s) is added to the base paint or ink, whether the Phosphate Dispersant(s) is used to disperse the base pigment in the non-aqueous medium, whether the Phosphate Dispersant(s) is added after formulation of the base paint or ink or whether the Phosphate Dispersant is added together with the tinter composition. When two or more Phosphate Dispersants are included in the reduced shade paint or ink, they are preferably added simultaneously and may be included in the base paint or ink, or in the tinter composition, or they may be added at any intermediate stage in the preparation of the reduced shade paint or ink.

The reduced shade paint or ink containing one or more Phosphate dispersants also exhibits superior gloss compared with those reduced shade paints and inks which contain a dispersant which is other than a Phosphate Dispersant.

The ratio of the base paint or ink which is component (a) to the tinter composition which is component (c) of the reduced shade paint or ink is preferably from 5:1 to 50:1 and especially from 10:1 to 50:1 based on the total weight of the reduced shade paint or ink.

As a further aspect of the invention there is provided a composition comprising two Phosphate Dispersants wherein in one dispersant, Y is the group RO— and in the other dispersant, Y is the group H—(EO)—$_q$.

As a still further aspect of the invention there is provided a composition comprising two Phosphate Dispersants where Y is the group H—(EO)—$_q$ wherein the ratio of n:(q+m) for each dispersant is different.

As disclosed hereinbefore the Phosphate Dispersants are already known in the art and are typically prepared by heating a compound of formula 1 in an inert atmosphere with a phosphating agent such as phosphoric acid, polyphosphoric acid or phosphorus pentoxide at a temperature between 70 and 150° C. The dispersants are obtained as pourable liquids or low melting gums and waxes.

The reaction between the phosphating agent and the compound of formula 1 may optionally be carried out in the presence of an alcohol or alkanolamine or the phosphate esters of the compound of formula 1 may be subsequently heated with an alcohol or alkanolamine. When the reaction involves an alcohol the phosphate end group(s) are further partially esterified. When the reaction involves an alkanolamine additional ester and/or amide groups and/or amine salts of the phosphate ester of the compound of formula 1 are formed. It is believed that the reaction product is mainly an amine salt.

The Phosphate Dispersants may also be present as the salt of an alkali metal or ammonia.

The following Phosphate Dispersants have been evaluated as dispersants for particulate solids in the organic medium and the references to the various agents in the tables below are retained throughout the following examples:

TABLE A

A) Dispersants which are phosphate esters of a copolymer of general formula MeO(PO)$_n$(EO)$_m$-H. They were prepared by reacting the end-capped PO/EO polymer with P$_2$O$_5$.

| | n | m | Polymer to P$_2$O$_5$ ratio | Appearance |
|---|---|---|---|---|
| Dispersant 1 | 10 | 20 | 2:1 | Brown waxy solid |
| Dispersant 2 | 15 | 15 | 2:1 | Brown viscous liquid |
| Dispersant 3 | 20 | 10 | 2:1 | Brown viscous liquid |
| Dispersant 4 | 10 | 20 | 3:1 | Brown waxy solid |
| Dispersant 5 | 15 | 15 | 3:1 | Brown viscous liquid |
| Dispersant 6 | 20 | 10 | 3:1 | Brown viscous liquid |

TABLE B

B) Dispersants which are phosphate esters of a copolymer of general formula H-(EO)$_q$(PO)$_n$(EO)$_m$-H. They were prepared by reacting the EO/PO/EO block copolymer with P$_2$O$_5$.

| | q | n | m | Polymer of P$_2$O$_2$ ratio | Appearance |
|---|---|---|---|---|---|
| Dispersant 7 | 9.7 | 16.4 | 9.7 | 3:1 | Yellow oil |
| Dispersant 8 | 13.1 | 30.2 | 13.1 | 3:1 | Yellow oil |
| Dispersant 9 | 6.25 | 56.0 | 6.25 | 3:1 | Pale brown oil |
| Dispersant 10 | 7.95 | 47.4 | 7.95 | 3:1 | Brown liquid |
| Dispersant 11 | 9.09 | 56.0 | 9.09 | 3:1 | Brown liquid |
| Dispersant 12 | 12.95 | 35.3 | 12.95 | 3:1 | Yellow oil |
| Dispersant 13 | 5.7 | 39.0 | 5.7 | 3:1 | Brown liquid |

Footnote to Table B
The EO/PO/EO block copolymers used to make Dispersants 7–12 were Synperonic PE/L35, Synperonic PE/L64, Pluronic L101, Synperonic PE/L92, Pluronic P102, Pluronic L72 and Synperonic PE/L81, respectively.

The invention is further illustrated with reference to the following examples wherein all amounts are given in parts by weight unless indicated to the contrary.

EXAMPLES 1–4

Mill Bases for Nitrocellulose Flexographic Inks containing Permanent Yellow PGRL04

A mill-base was prepared by milling a mixture of Permanent Yellow PGRL04 (30 parts ex Hoechst), dispersant (4.35 parts) and nitrocellulose resin (65.65 parts as a 16% w/w solution in a mixture of ethanol/ethylacetate (3:1), SM 1359 ex Coates Lorilleux) in the presence of 3mm glass beads (125 parts) for 30 minutes. The mill base was then separated from the glass beads and let down with a mixture of SM 1359 (131.05 parts), dioctylphthalate (11.42 parts) and ethanol/ethylacetate (5:1, 57.53 parts) to give a printing ink containing 10% wfw pigment. The ink was allowed to de-aerate and then applied to paper using a K-proofer (ex. Sheen Instruments) to give a film thickness of 1.2$\mu$. The film was air-dried for 90 minutes and then cured by heating at 120° C. for 20 minutes. The 60° gloss angle of the film was then measured using a Novogloss meter (Rhopoint Instrumentation, UK).

The results are given in Table 1 below and show that the inks of the present invention exhibit superior gloss compared with a conventional agent derived from an . - EO/PO block copolymer derived from diethylaminoethanol.

TABLE 1

| Example | Dispersant | 60° gloss |
|---|---|---|
| 1 | 7 | 25.6 |
| 2 | 8 | 28.5 |
| 3 | 9 | 19.9 |
| 4 | 10 | 22.5 |
| Control | S | 21.3 |

Footnote to Table 1
Dispersant S is Agent J of U.S. Pat. No. 4,518,435.

EXAMPLES 5–8

Mill bases for flexographic inks containing Special Black 4.

These mill bases were prepared by the manner described in Examples 1–4 except using Special Black 4 (25 parts, ex Degussa), dispersant (5.42 parts) and nitrocellulose resin (SM 1359; 68.22 parts 16% w/w solution in a mixture of ethanol/ethylacetate (3:1)) in place of the Permanent Yellow, dispersant and resin for preparing the mill bases of Examples 1–4.

These mill bases were let down with nitrocellulose resin (SM 1359; 101.93 parts) dioctylphallate (8.9 parts) and ethanol/ethylacetate (5:1, 39.7 parts) in place of the let down formulation of Examples 1–4. The resulting printing inks containing 10% pigment were evaluated as described in Examples 1–4 and the results given in Table 2 below. These results show that inks made according to the present invention exhibit superior gloss compared with inks prepared using a conventional dispersant derived from an EO/PO block copolymer.

TABLE 2

| Example | Dispersant | 60° C. gloss |
|---|---|---|
| 5 | 7 | 18.1 |
| 6 | 8 | 17.9 |
| 7 | 9 | 17.0 |
| 8 | 10 | 18.3 |
| Control | S | 11.3 |

Footnote to Table 2
Dispersant S is as described in the footnote to Table 1.

EXAMPLE 9

Use of Dispersant 6 as Secondary Dispersing Agent in Long Oil Alkyd Paint.

Titanium dioxide (35 parts, Tioxide TR92) and a long-oil alkyd resin (18.8 parts as 20% (w/w) resin in white spirits, Synolac 50W ex Cray Valley) were milled together with 3mm glass beads (125 parts) for 15 minutes in a Red Devil shaker. The paint was then let down by adding more resin in white spirits (50 parts of 75% (w/w) Synolac 50W in white spirits). This paint was decanted from the beads and let down further with a mixture of long-oil alkyd resin (3.3 parts of 75% (w/w) Synolac 50W in white spirits), white spirits (5.1 parts) and mixed calcium/cobalt/zirconium driers (4.4 parts).

The final paint was divided into three portions and Dispersant 6 and Dispersant S, respectively, were added to separate portions in an amount of 5% (w/w) dispersant based on weight of paint. These paint samples were applied to paper using a K-proofer as described in Examples 1–4 and the paint-films dried and cured as previously described. The gloss/haze of the paint-film was measured using a Byk Garner glossmeter and the LAB colour co-ordinates were measured using a Dr. Lange Colorimeter. The results are given in Table 3 below and show that the paint containing Dispersant 6 as secondary dispersing agent exhibits superior gloss and reduced haze compared with the control and Dispersant S and that Dispersant 6 gives a paint of superior whiteness and blueness of shade.

TABLE 3

| Dispersing | Gloss | | | | | |
|---|---|---|---|---|---|---|
| Agent | 20° | 60° | Haze | L | A | B |
| Dispersant 6 | 86.4 | 94.1 | 28.6 | 96.3 | −0.3 | 2.4 |
| Dispersant S | 80.0 | 91.7 | 48.1 | 95.9 | 0 | 3.4 |
| Control | 82.0 | 90.9 | 36.0 | 95.8 | −0.3 | 3.1 |

Footnote to Table 3
Control contains no secondary dispersant.
Dispersant S is as described in the footnote to Table 1.

EXAMPLE 10

Use of Dispersant 6 as Primary Dispersing Agent in White Spirit Paint.

A white millbase was prepared by milling together titanium dioxide and a long-oil alkyd resin in white spirits both in the presence and absence of Dispersant 6. The amounts of the various components are listed in Table 4A below

TABLE 4A

| Example or Comparative Example | 10 | Control |
|---|---|---|
| Tioxide TR 92 | 35.35 | 35 |
| Dispersant 6 | 2.14 | — |
| Synolac 50W (75% in white spirits) | 4.88 | 18.8 |
| White Spirits | 12.0 | 5.1 |

The millbases were prepared by milling the titanium dioxide and resin with and without Dispersant 6 for 15 minutes on a Red Devil shaker in the presence of 3 mm glass beads (125 parts). The millbase was then separated and let down with a mixture of 75% Synolac 50W in white spirits (3.3 parts), white spirits (5.1 parts) and mixed driers (4.4 parts) as described in Example 9. The resultant paint was then applied to card, dried and cured as described in Example 9 and the gloss, haze and colour co-ordinates determined as in the previous example. The results are given in Table 4b below which show that millbase containing Dispersant 6 exhibits superior gloss and significantly reduced haze compared with the control wherein the resin is the sole dispersing agent.

TABLE 4B

| | Gloss | | | | | |
|---|---|---|---|---|---|---|
| | 20° | 60° | Haze | L | A | B |
| Example 10 | 86.8 | 92.4 | 16.0 | 96.1 | −0.6 | 1.0 |
| Control | 76.9 | 84.9 | 29.2 | 96.0 | −0.8 | 1.0 |

EXAMPLE 11

Use of Dispersant 6 as Primary Dispersant in Polyester Paint.

A white millbase was prepared by milling together the various components in the amounts given in Table 5a below using the method described in Example 10.

TABLE 5A

| Example | 11 | Control |
|---|---|---|
| Tioxide TR 92 | 54.74 | 39.6 |
| Dispersant 6 | 3.32 | — |
| Aroplaz 6820 | 3.43 | 4.26 |
| Butanol | 0.52 | 3.41 |
| MPA | 10.98 | 13.65 |

Footnote to Table 5A
Aroplaz 6820 is a polyester/melamine formaldehyde resin supplied by Rheichold, USA.

MPA is methoxypropylacetate.

The millbase was then separated from the glass beads and let down with the formulations in the amounts given in Table 5b below.

TABLE 5B

| Example | 11 | Control |
|---|---|---|
| Aroplaz 6820 | 44.47 | 30.38 |
| Cymel 303 | 20.74 | 15.0 |
| Butanol | 13.76 | 8.67 |
| MPA | 16.71 | 27.12 |
| Butylacetate | 16.71 | 12.23 |
| Xylene | 5.57 | 4.08 |

Footnote to Table 5B
Cymel 303 is a melamine/formaldehyde cross-linking resin ex American Cyanamid.

The resulting paint formulation was sprayed onto card and then dried and cured as described in Example 9. The gloss, haze and colour co-ordinates were measured as described in Example 9 and the details given in Table 5c below. These data show that the gloss is significantly higher in the case of the paint prepared from the millbase containing Dispersant 6 compared with the paint prepared from the millbase where the resin acts as dispersing agent. The haze of the paint containing Dispersant 6 is also much lower.

TABLE 5C

| | Gloss | | | | | |
|---|---|---|---|---|---|---|
| | 20° | 60° | Haze | L | A | B |
| Example 11 | 96.6 | 103.6 | 40.4 | 98.6 | −0.3 | 0.7 |
| Control | 86.5 | 96.5 | 53.8 | 98.4 | −0.4 | 0.5 |

EXAMPLES 12 to 18

Use of Dispersants in Alkyd Resin/White Spirits Paint.

A white millbase was prepared by milling titanium dioxide (60 parts; Kronos 2190), dispersant (2.4 parts), resin (30.76 parts; Wresinol AF 9300 (100%) ex. Resinous Chemicals Ltd) and white spirits (6.84 parts) for 20 minutes in a 4oz bottle containing 3 mm glass beads (125 parts) using a Red Devil shaker. The millbase contained 77% (w/w) resin based on weight of millbase.

A control was also prepared wherein the dispersant was replaced by an equal weight of white spirits.

The beads were then removed from the millbase which was added to a letdown formulation to form the final paint. The letdown contained Wresinol AF 9300 (45.98 parts), white spirits (12.52 parts), methylethylketoxime (0.61 parts) and mixed driers (6.29 parts, Durham VX71 ex. Durham Chemicals).

The paint was then applied to a non-glossy card using K-bar number 4 (36μ wet film thickness) dried and cured as described in Examples 14. The gloss/haze of the paint-film was measured using a Byk Garner glossmeter and the LAB co-ordinates were measured using a Dr. Lange Colormeter. The results are given in Table 6 below:

TABLE 6

| | | Gloss | | | | | |
|---|---|---|---|---|---|---|---|
| Example | Dispersant | 20° | 60° | Haze | L | a | b |
| 12 | 6 | 93.1 | 102 | 34.2 | 98.9 | −0.8 | −0.2 |
| 13 | 11 | 81.6 | 91.5 | 31.9 | 99.5 | −0.6 | 0.7 |
| 14 | 12 | 80.6 | 91.2 | 43.9 | 99.3 | −0.5 | 0.1 |
| 15 | 10 | 80.5 | 92.4 | 78.3 | 98.2 | −0.4 | −0.1 |
| 16 | 9 | 79.5 | 89.9 | 87.6 | 98.3 | −0.5 | −0.2 |
| 17 | 8 | 70.9 | 87.6 | 159 | 98.4 | −0.3 | 0.4 |
| 18 | 7 | 59.6 | 85.7 | 173 | 97.9 | −0.9 | 0.7 |
| | S | 72.4 | 90.8 | 107 | 98.0 | −0.3 | 0.4 |
| Control | — | 73.6 | 85.6 | 42.2 | 98.5 | −0.6 | 0.1 |

Footnote to Table 6
Dispersant S is as described in the footnote to Table 1.

EXAMPLES 19 to 25

Examples 12 to 18 were repeated with a yellow reduced shade tinter wherein the white paint (5 parts) was stirred with a yellow tinter (0.56 parts). The yellow tinter was prepared by milling together Hostaperm Yellow H3G (37.5 parts, Ex. Hoechst), dispersant (4.5 parts), fluidising agent (1.12 parts) and water (56.88 parts) for 30 minutes in a 4oz bottle in the presence of glass beads (3 mm diameter, 125 parts) using a Red Devil shaker. The beads were then separated, and the yellow dispersion let down with propylene glycol (56.88 parts) to give the yellow tinter. The results are given in Table 7 below.

TABLE 7

| | Dis- | Gloss | | | | | |
|---|---|---|---|---|---|---|---|
| Example | persant | 20° | 60° | L | a | b | % Strength |
| 19 | 6 | 56.1 | 88.3 | 94.5 | −2.5 | 27.2 | 2.3% stronger |
| 20 | 9 | 55.9 | 87.1 | 94.2 | −3.6 | 31.0 | 4.7% stronger |
| 21 | 12 | 51.2 | 84.2 | 94.0 | −2.8 | 26.2 | 6% stronger |
| 22 | 11 | 43.8 | 86.6 | 93.1 | −3.2 | 32.8 | 15% stronger |
| 23 | 8 | 40.0 | 82.7 | 93.0 | −3.7 | 34.6 | 15% stronger |
| 24 | 7 | 28.2 | 70.3 | 92.4 | −3.2 | 32.4 | 21% stronger |
| 25 | 10 | 3.4 | 20.6 | 89.6 | −3.0 | 36.5 | 53% stronger |
| | S | 40.8 | 81.9 | 95.1 | −0.1 | 18.6 | 2.2% weaker |
| Control | — | 37.7 | 78.3 | 94.8 | −0.9 | 21.4 | — |

Footnote to Table 7
Dispersant S is as described in the footnote to Table 1

EXAMPLES 26 to 30

Examples 12 to 18 were repeated with a red iron oxide tinter (0.56 parts ex. Holidays) mixed with the white base paint. The results are given in Table 8 below.

TABLE 8

| | Dis- | Gloss | | | | | |
|---|---|---|---|---|---|---|---|
| Example | persant | 20° | 60° | L | a | b | % Strength |
| 26 | 6 | 61.8 | 84.6 | 54.6 | 21.7 | 5.1 | 22.4% stronger |
| 27 | 8 | 35.1 | 74.9 | 49.7 | 23.7 | 7.6 | 98.5% stronger |
| 28 | 9 | 50.1 | 81.3 | 53.1 | 22.2 | 6.3 | 43% stronger |
| 29 | 12 | 63.9 | 84.9 | 54.8 | 20.7 | 4.2 | 16% stronger |
| 30 | 11 | 18.8 | 67.9 | 49.0 | 23.9 | 7.6 | 110% stronger |
| Control | — | 65.4 | 84.9 | 56.8 | 20.8 | 4.5 | — |

EXAMPLES 31 to 35

Examples 26 to 30 were repeated except that the red iron oxide tinter was replaced by the same weight of violet tinter ex. Huls GmbH. The results are given in table 9 below.

TABLE 9

| | Dis- | Gloss | | | | | |
|---|---|---|---|---|---|---|---|
| Example | persant | 20° | 60° | L | a | b | % Strength |
| 31 | 6 | 39.3 | 78.1 | 68.9 | 8.2 | −23.3 | 1.7% stronger |
| 32 | 8 | 14.5 | 59.4 | 57.5 | 15 | −33.6 | 150% stronger |
| 33 | 9 | 55.4 | 82.9 | 65.6 | 10.3 | −26.4 | 32% stronger |
| 34 | 12 | 49.4 | 81.2 | 66.6 | 9.4 | −24.4 | 22% stronger |
| 35 | 11 | 26.2 | 70.1 | 57.9 | 13.5 | −32 | 143% stronger |
| Control | — | 51.2 | 84.1 | 69.1 | 7.9 | −20.8 | — |

EXAMPLES 36 to 55

A flat styrene-butadiene masonry paint was prepared by mixing the following ingredients in a high speed mixer to give a white paint.

5.14 parts Styrene-butadiene resin (Pliolite AC80, ex Goodyear)

3.40 parts Styrene-butadiene resin (Pliolite AC4, ex Goodyear)

6.74 parts Chlorinated rubber polymer (Cereclor 54DP, ex ICI PLC)

1.0 part Dispersant 17.47 parts Titanium dioxide (Tioxide TR92, ex Tioxide)

27.95 parts Extender (Microdol H600, ex Norwegian Talc)

5.53 parts Extender (Celite 281, ex Celite (UK) Ltd 25.98 parts White spirits 6.79 parts Aromatic petroleum distillate (Solvesso 100, ex Esso)

A universal tinter formulation was added in the weight ratio of 10 parts tinter formulation to 90 parts by weight white paint both with and without post-addition of a dispersant. Where a post-addition of dispersant was made, the weight of the added dispersant was 2.5 parts percentage based in the weight of the white paint.

The white paint containing the universal tinter was coated on to a card using a K-proofer and no. 6 K-bar to give a film thickness of 60 μ.

A drop of the final paint composition was also applied to the paint film and rubbed into the surface using finger pressure until the film became tacky. It was then dried at 20 to 25° C. for 4 hours.

The L, a, b colour co-ordinates were then measured for the rubbed area and also the area of paint-film to which no additional paint had been applied. The difference between these two sets of measurements (ΔE) gives a measure of acceptance of the universal tinter by the base white paint. ΔL is $L_1-L_2$, Δa is $a_1-a_2$, Δb is $b_1-b_2$ where subscript 1 relates to the paint-film with no additional paint and subscript 2 relates to the area of paint-film to which additional paint was applied followed by finger rubbing.

$$\Delta E = \sqrt{(\Delta L)^2 + (\Delta a)^2 + (\Delta b)^2}$$

Low values of ΔE indicate good acceptance of the universal tinter.

The results are given in Tables 10, 11, 12 and 13 below. The term "flooding" means a floating of the tinter pigment to the surface giving a more intense colour.

TABLE 10

Tinter:-Nuodex high strength lamp black (ex. Huls)

| Ex. | Dispersant in base paint | Post-added Dispersant | ΔL | Δa | Δb | ΔE | Visual assessment |
|---|---|---|---|---|---|---|---|
| 36 | Dispersant 6 | — | -1.8 | 0.1 | 0.8 | 2.0 | Flooding |
| 37 | Dispersant 8 | — | -2.4 | 0.2 | 0.4 | 2.5 | Flooding |
| 38 | Dispersant 8 + 13 | — | -1.4 | 0.4 | -0.2 | 1.5 | Slight flooding |
| 39 | SL | Dispersant 6 | 0.4 | 0.2 | 0.1 | 0.4 | Good |
| 40 | SL | Dispersant 8 | -0.6 | 0.5 | -0.1 | 0.8 | Slight flooding |
| 41 | Dispersant 8 | Dispersant 6 | 0.4 | -0.3 | 0.3 | 0.7 | Good |
| 42 | Dispersant 8 + 13 | Dispersant 8 + 13 | -0.3 | 0.1 | 0.3 | 0.5 | Good |
| Control | SL | — | -4.6 | 1.2 | 0.7 | 4.8 | Severe flooding |

Footnote to Table 10
SL is Soya lecithin
Dispersant 8 + 1 3 is a 50/50 mix by weight

TABLE 11

Tinter:Nuodex Phthalocyanine Blue (ex. Huls)

| Ex. | Dispersant in base paint | Post-added Dispersant | ΔL | Δa | Δb | ΔE | Visual assessment |
|---|---|---|---|---|---|---|---|
| 43 | Dispersant 6 | — | -0.8 | 0 | -1.1 | 1.4 | Severe flooding |
| 44 | Dispersant 8 | — | 0 | -0.2 | 0.1 | 0.2 | Good |
| 45 | Dispersant 8 + 13 | — | -0.7 | -0.1 | -0.2 | 0.7 | Good |
| 46 | SL | Dispersant 6 | -0.6 | 0.2 | -1.9 | 2.0 | Severe flooding |
| 47 | SL | Dispersant 8 | -1.0 | -0.3 | -2.6 | 2.8 | Severe flooding |
| 48 | Dispersant 8 | Dispersant 6 | -0.5 | 0.1 | -0.6 | 0.1 | Good |
| Control | SL | — | -0.1 | -0.1 | -2.0 | 2.2 | Severe flooding |

Footnote to Table 11
SL and Dispersant 8 + 13 is as explained in the footnote to Table 10.

TABLE 12

Tinter:Nuodex Red Iron Oxide (ex. Huls)

| Ex. | Dispersant in base paint | Post-added Dispersant | ΔL | Δa | Δb | ΔE | Visual assessment |
|---|---|---|---|---|---|---|---|
| 49 | Dispersant 6 | — | -0.1 | 0.2 | 0.4 | 0.5 | Good |
| 50 | Dispersant 8 | — | -1.1 | 0.8 | 0.2 | 1.4 | Slight flooding |
| 51 | Dispersant 8 + 13 | — | -0.5 | -0.1 | 0.3 | 0.6 | Good |
| 52 | SL | Dispersant 6 | -0.2 | 0.9 | 0.5 | 1.0 | Yellower |
| 53 | SL | Dispersant 8 | -2.8 | 2.0 | 2.0 | 4.0 | Very blue |
| 54 | Dispersant 8 | Dispersant 6 | -0.6 | -0.1 | 0.9 | 1.1 | Good |
| Control | SL | — | 0.2 | 1.5 | 1.3 | 2.0 | Severe shade change |

Footnote to Table 12
SL and Dispersant 8 + 13 is as explained in the footnote to Table 10.

TABLE 13

Tinter:Nuodex Dioxazine Violet (ex. Huls)

| Ex. | Dispersant in base paint | Post-added Dispersant | ΔL | Δa | Δb | ΔE | Visual assessment |
|---|---|---|---|---|---|---|---|
| 55 | Dispersant 8 + 13 | — | -0.8 | 1.3 | -1.4 | 2.1 | Good |
| Control | SL | — | -1.2 | 2.7 | -4.0 | 5.0 | Severe flooding |

Footnote to Table 13
SL and Dispersant 8 + 13 is as explained in the footnote to Table 10.

We claim:

1. A reduced shade paint or ink comprising
   (a) a base paint or ink comprising a base pigment, a film-forming resin and a non-polar liquid;
   (b) one or more dispersants which is a phosphate ester of a compound of formula 1

$$Y—(PO)_n(EO)_m— \quad (1)$$

wherein
   Y is a group RO— or a group $H—(EO)_q$;
   R is $C_{1-10}$-alkyl;
   m and q are each, independently, from 5 to 50;
   n is from 5 to 70;
   PO represents polyoxypropylene; and
   EO represents polyoxyethylene; and
   (c) a tinter composition comprising a coloured pigment, water and/or a water-miscible solvent, the ratio of component (a) to component (b) being from 5:1 to 50:1 by weight.

2. A reduced shade paint or ink as claimed in claim 1 wherein the base pigment is an inorganic pigment.

3. A reduced shade paint or ink as claimed in claim 1 wherein the base pigment is a white pigment.

4. A reduced shade paint or ink as claimed in claim 1 wherein the base pigment is titanium dioxide.

5. A reduced shade paint or ink as claimed in claim 1 wherein R is methyl.

6. A reduced shade paint or ink as claimed in claim 1 wherein m and n are each, independently, from 5 to 25 when Y is the group RO—.

7. A reduced shade paint or ink as claimed in claim 1 wherein the ratio of m to n is from 2:1 to 1:5 when Y is the group RO—.

8. A reduced shade paint or ink as claimed in claim 1 wherein m and q are each, independently, from 5 to 20 when Y is the group $H—(EO)_q$—.

9. A reduced shade paint or ink as claimed in claim 1 wherein the ratio of (q+m) to n is from 1:1 to 1:5 when Y is the group $H—(EO)_q$—.

10. A reduced shade paint or ink as claimed in claim 1 wherein the non-polar liquid is an aliphatic or aromatic petroleum distillate, including mixtures thereof.

11. A reduced shade paint or ink as claimed in claim 1 wherein the water-miscible solvent is ethyleneglycol, propylene glycol, hexyleneglycol or a glycolether.

12. A reduced shade paint or ink as claimed in claim 1 which contains two or more dispersants which are phosphate esters of formula 1.

13. A reduced shade paint or ink as claimed in claim 12 wherein one or more of the dispersants is added after forming the base paint or ink.

14. A reduced shade paint or ink as claimed in claim 12 wherein one of the dispersants contains the group RO— and another dispersant contains the group $H—(EO)_q$—.

15. A reduced shade paint or ink as claimed in claim 12 wherein all the dispersants contain the group $H—(EO)_q$—.

16. A reduced shade paint or ink as claimed in claim 1 wherein the ratio of component (a) to component (c) is from 10:1 to 50:1 by weight.

17. A composition comprising two dispersants which are phosphate esters of a compound of formula 1

$$Y—(PO)_n(EO)_m—H \quad 1$$

wherein in one dispersant, Y is the group RO— and in the other dispersant Y is the group
    $H—(EO)_q$—;
    R is $C_{1-10}$-alkyl;
    m and q are each, independently, from 5 to 50;
    PO represents polyoxypropylene; and
    EO represents polyoxyethylene; and
    n is from 5 to 70.

18. A composition comprising two dispersants which are both phosphate esters of a compound of formula 1

$$Y—(PO)_n(EO)_m—H \quad 1$$

wherein
    Y is the group $H—(EO)_q$—;
    m and q are each, independently, from 5 to 50;
    PO represents polyoxypropylene; and
    EO represents polyoxyethylene; and
    n is from 5 to 70.

* * * * *